Feb. 17, 1931.            W. MERTÉ            1,792,917
PHOTOGRAPHIC OBJECTIVE
Filed Sept. 23, 1927
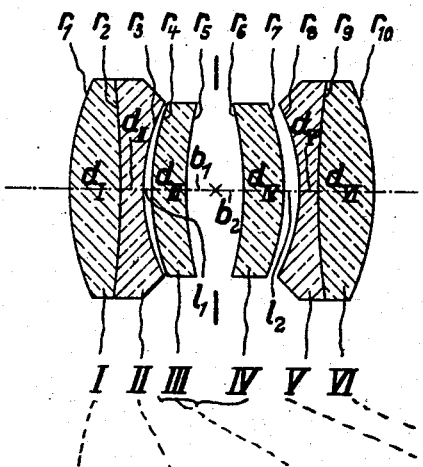
Radii:
$r_1 = +25.90$
$r_2 = -96.10$
$r_3 = +18.41$
$r_4 = +23.78$
$r_5 = +35.54$
$r_6 = -33.12$
$r_7 = -22.74$
$r_8 = -18.14$
$r_9 = +77.38$
$r_{10} = -25.37$
Thicknesses and distances:
$d_1 = 5.12$
$d_{II} = 2.31$
$l_1 = 0.75$
$d_{III} = 3.48$
$b_1 = 2.90$
$b_2 = 2.80$
$d_{IV} = 3.96$
$l_2 = 1.57$
$d_V = 1.88$
$d_{VI} = 5.56$
Kinds of glass: $n_D$ { 1.61087   1.53994   1.56064   1.53994   1.61087
$\nu$ = 55.8   47.4   61.1   47.4   55.8
Focal length: 100
Inventor:
Willy Merté

Patented Feb. 17, 1931

1,792,917

UNITED STATES PATENT OFFICE

WILLY MERTÉ, OF JENA, GERMANY, ASSIGNOR TO THE FIRM CARL ZEISS, OF JENA, GERMANY

PHOTOGRAPHIC OBJECTIVE

Application filed September 23 1927, Serial No. 221,592, and in Germany September 28, 1926.

The present invention relates to such photographic double objectives, corrected spherically, chromatically, astigmatically and for coma, whose halves consist each of an isolated collective meniscus, facing the diaphragm, and of two members cemented together, viz., a biconcave and a biconvex member.

According to the present invention one attains a good correction, extending over a large image field, by constructing the two halves of the double objective in such a way that when using each of the same so as to receive light pencils composed each of rays which are parallel to one another and coming from the side of the meniscus through a small diaphragm lying there, the rays intersect each other in such a manner that at least with larger angles of inclination of the ray pencils relatively to the axis the sagittal and the tangential points of intersection of the rays follow each other with both halves in opposite sense.

The annexed drawing shows as an example a double objective according to the present invention whose numerical values are given in the subjoined table for a focal length of the double objective of 100 units. The double objective shown sharply covers at a relative aperture of 1:4.5 an image field of 65°. Each of the halves may also be used singly.

| Radii | Thicknesses and distances |
|---|---|
| $r_1 = +25.90$ | $d_I = 5.12$ |
| $r_2 = -96.10$ | $d_{II} = 2.31$ |
| $r_3 = +18.41$ | $l_1 = 0.75$ |
| $r_4 = +23.78$ | $d_{III} = 3.48$ |
| $r_5 = +35.54$ | $b_1 = 2.90$ |
| $r_6 = -33.12$ | $b_2 = 2.80$ |
| $r_7 = -22.74$ | $d_{IV} = 3.96$ |
| $r_8 = -18.14$ | $l_2 = 1.57$ |
| $r_9 = +77.38$ | $d_V = 1.88$ |
| $r_{10} = -25.37$ | $d_{VI} = 5.56$ |

Kinds of glass

| | I and VI | II and V | III and IV |
|---|---|---|---|
| $n_D$ | 1.61087 | 1.53994 | 1.56064 |
| $\nu$ | 55.8 | 47.4 | 61.1 |

I claim:

Photographic double objective, corrected spherically, chromatically astigmatically and for coma, composed of two unsymmetrical halves, each of which consists of an isolated collective meniscus, facing the other half, and of two members cemented together, of which two members one is biconcave and one biconvex, the two halves being so constructed that when using each of the same so as to receive light pencils composed each of rays which are parallel to one another and coming from the side of the meniscus through a small diaphragm lying there, the rays intersect each other in such a manner that at least with larger angles of inclination of the ray pencils relatively to the axis the sagittal and the tangential points of intersection of the rays follow each other with both halves in opposite sense.

WILLY MERTÉ.